2,874,305

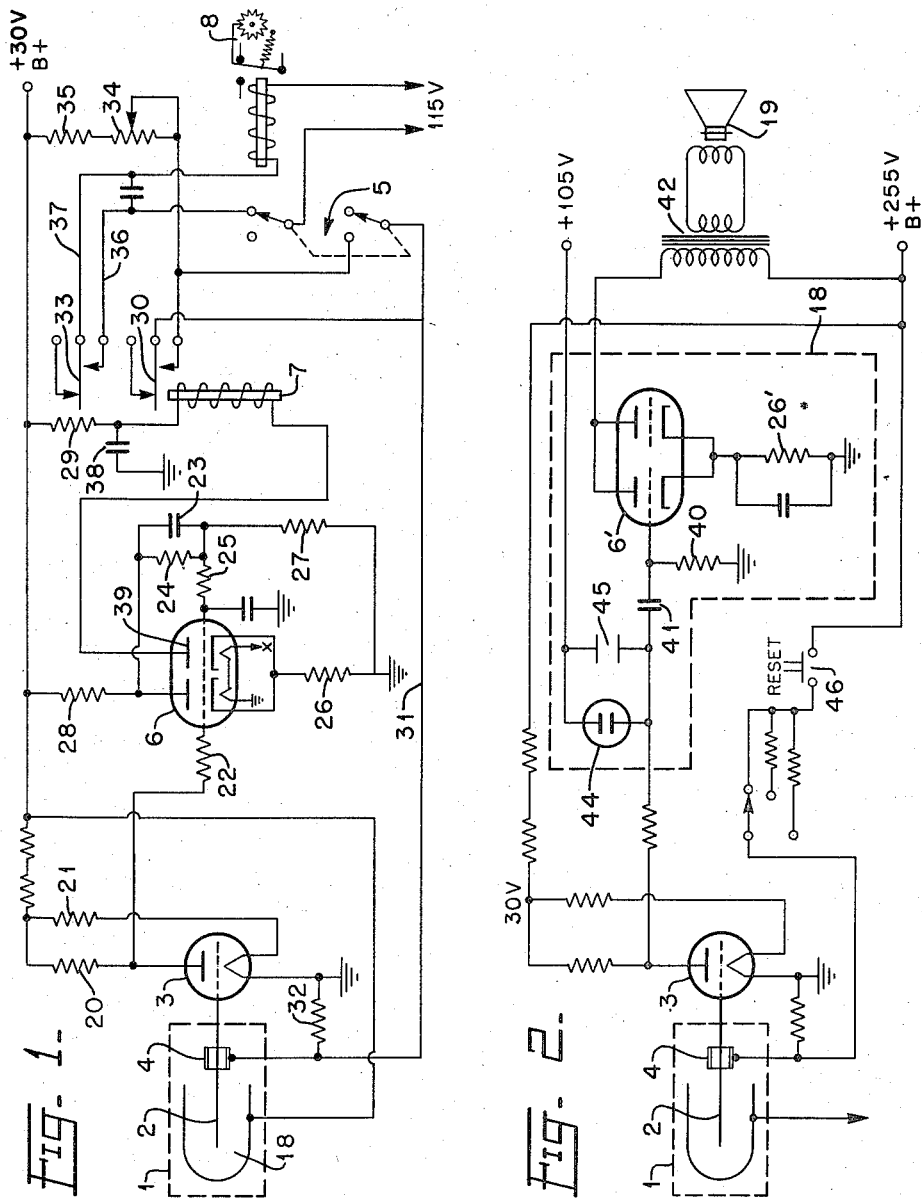
Feb. 17, 1959  H. N. WILSON ET AL  2,874,305
RADIATION INTEGRATOR
Filed Oct. 17, 1955  2 Sheets-Sheet 1
INVENTORS
Floyd M. Glass
and
Hubert N. Wilson
BY
ATTORNEY

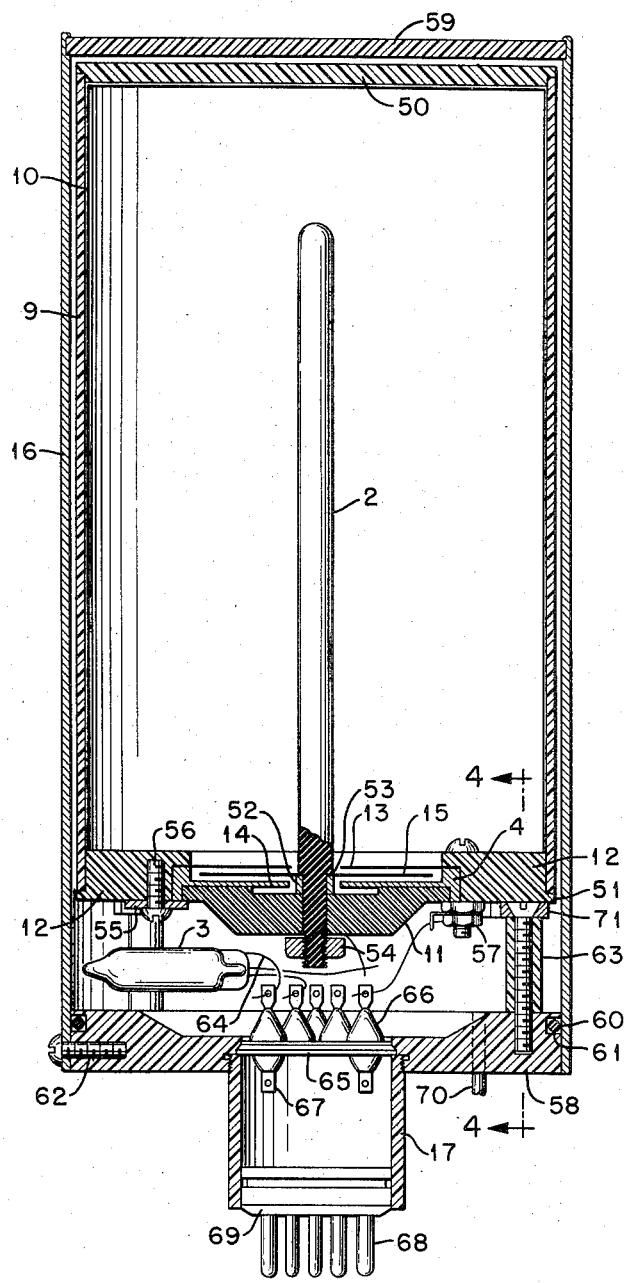
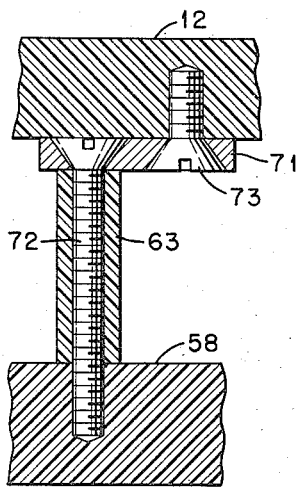
Fig. 3.
Fig. 4.
INVENTORS
Floyd M. Glass
and
Hubert N. Wilson United States Patent Office
2,874,305
Patented Feb. 17, 1959

RADIATION INTEGRATOR

Hubert N. Wilson, Oak Ridge, and Floyd M. Glass, Norris, Tenn., assignors to the United States of America as represented by the United States Atomic Energy Commission Application October 17, 1955, Serial No. 541,104

10 Claims. (Cl. 250—83.6)

This invention relates to radiation detecting and measuring devices and systems, and more particularly to a compact, integrating, background monitor that utilizes one of operating principles of the prior co-pending application of Glass, S. N. 329,032, now Patent No. 2,728,861, issued December 27, 1955.

One of the many problems associated with the handling of radioactive substances is that of determining the quantity of radiation (dose) to which operating personnel are exposed. Certain tolerance doses have been established for individuals beyond which serious consequences may result, so it is desirable that personnel working with radioactive substances or present in the area where radiation may exist know what portion of this tolerance dose they have received at any given time, and that they be warned when the tolerance dose has been reached or exceeded.

While instruments which will integrate the radiation and provide an indication of the total radiation received, as well as the instantaneous magnitude of the radiation, are commercially available, these instruments generally have the disadvantage that leakage currents are high by reason of the many leakage paths resulting from the large number of components which are connected in parallel in the circuits of these instruments and the lengths of leads necessary to couple them. Other factors contributing to leakage include the failure to enclose and hermetically seal the components of the system, thereby exposing them to the harmful effects of moisture and dirt. As a consequence, it is necessary to compensate for the resulting leakage through the provision of larger capacitors, larger radiation detectors, and other components which are themselves subject to greater leakage and which serve to impose a further limitation on the system.

Applicants with a knowledge of these problems of the prior art have for an object of their invention the provision of a radiation detecting system which will integrate the radiation and will automatically reset itself after being subjected to a predetermined quantity of radiation.

Applicants have as another object of their invention the provision of a radiation integrating system which will provide an audible signal upon reaching the tolerance dosage of radiation until reset manually.

Applicants have as another object of their invention the provision of a radiation detecting system wherein the grid of the electrometer tube is directly connected to an electrode of the condenser thereby eliminating lengths of connecting cable and such high impedance elements as relays and pushbuttons for effecting operation.

Applicants have as a further object of their invention the provision of a radiation detecting system wherein the principal components are enclosed and hermetically sealed to insure low leakage.

Applicants have as a further object of their invention the provision of a radiation detecting device wherein the leakage paths are reduced to a minimum by employing only a single insulator to support the collector electrode and condenser plate.

Applicants have as a still further object of their invention the provision of a radiation detecting device wherein leakage paths are reduced by making the outer plate of the condenser also function as a guard ring of the radiation detector.

Applicants have as a still further object of their invention the provision of a radiation detecting device wherein the primary accelerating voltage for the radiation detector is placed on the outer coating rather than on the center collector electrode in order to make ion collection independent of the potential of the collector.

Applicants have as a still further object of their invention the provision of a radiation detector which will operate much higher on the saturation curve, enabling it to function in a much higher level radiation field while preserving linearity.

Other objects and advantages of our invention will appear from the following specification and accompanying drawings, and the novel features thereof will be particularly pointed out in the annexed claims.

In the drawings Figure 1 is a schematic of one form of our improved radiation detector integrating system.

Figure 2 is another modification in schematic of the circuit of our improved radiation detector integrating system.

Figure 3 is an elevation in section of our improved radiation detector device.

Figure 4 is a detail of the mounting for our improved detector device within its enclosure.

Referring to the drawings in detail, the circuit of Figure 1 is a schematic of our improved radiation detector integrating system wherein a means is provided for detecting ionizing radiations, a circuit for charging the detecting element is employed, and an arrangement to initiate a signal when a preset quantity of radiation has been detected and means responsive to the operation of the circuit for resetting the charge on the detecting element are utilized.

In the above arrangement, the detecting element takes the form of an ion chamber 1 having its collecting electrode 2 direct coupled to the control grid of a triode 3 having the characteristics of an electrometer tube. The plate or anode of the tube 3 is of special design to give it the characteristics of an electrometer tube, and may take the form of a Victoreen type 5803, VX34, or VX32B, or any other suitable type which has the characteristic of drawing low grid current (in the order of $10^{-17}$A when cut off). The anode of this tube is then coupled through the conventional load resistor 20 to a source of B+ potential, which preferably is of the order of 30 volts. The coupling may also include other conventional types of resistors since the filament or cathode of tube 3 is likewise coupled to the source of B+ potential through a resistor 21. The anode of tube 3 is also coupled through a resistor 22 to the control grid of the first section of double triode 6 which comprises a part of a conventional Schmitt trigger circuit. In this arrangement the anode of the first section of double triode 6 is coupled through a condenser 23 and a pair of resistors 24 and 25 to the control grid of the second section of the double triode 6. The cathodes of the first and second sections, respectively, of the double triode 6 are joined together and coupled to ground through a common cathode resistor 26. The control grid of the second section of double triode 6 is likewise coupled to ground through a large grid resistor 27 preferably of the order of 150K. The anode of the first section of double triode 6 is coupled through a load resistor 28 to B+ and the anode of the second section of double triode 6 is coupled through winding of relay 7 and load resistor 29, in series, to B+.

Relay 7 is of the double armature type. The first armature 30 is connected to one side of a condenser 4, located within the ion chamber 1, and to the lower wiper arm of manually-operated gang switch 5. This circuit, including lead 31, is grounded through a resistor 32 having a value that will provide a desired calibration range (depends on value of voltage divider 34, 35). The second armature 33 is coupled to one side of the winding of a register or mechanical recorder 8 which is in turn coupled through the upper wiper arm and one of the contacts of gang switch 5 to a source of potential.

When the relay 7 is energized, the armatures 30, 33 are in front contact position, and condenser 4 is coupled directly through lead 31, armature 30, front contact of relay 7 and voltage divider 34, 35 to B+. At the same time the second armature 33 of relay 7 completes a circuit from the source of potential through the upper wiper arm of switch 5, lead 36, front contact of relay 7, armature 33, and lead 37 to the winding of mechanical register 8. When relay 7 is deenergized both armatures 30 and 33 are in back contact position and break the circuits to condenser 4 and mechanical register 8, respectively.

In its operation, a positive voltage from B+ is applied by manually moving the start switch 5 so that a circuit is completed from B+ through voltage divider 34, 35 contacts of switch 5, lead 31 to condenser 4 and then to ground through resistor 32. This raises the potential of one set of plates of the condenser to a predetermined level. However, the other set of condenser plates cannot rise to the same potential since the electrode 2, to which they are coupled, is directly connected to the grid of the electrometer tube 3. The grid of the electrometer tube 3 draws grid current and this tube acts as a diode clamp which prevents the electrode 2 and other set of plates of the condenser from going positive. Then as the charge leaks off of the first set of condenser plates to ground through the resistor 32, such action causes the other set of condenser plates to fall in potential to a point where the electrode 2, coupled thereto, is below ground. This has the effect of biasing the electrometer tube 3 below cut off.

As an ionizing radiation penetrates the ion chamber 1, gases in the chamber 18 are ionized, charge is built up on the electrode as positive ions migrate to the electrode 2, the migation being in proportion to the amount of radiation present. This raises the potential of the collector electrode 2, and such situation continues until the electrometer tube 3 is above cut off and begins to conduct. When this occurs the potential at the anode of the electrometer tube 3 drops below the triggering voltage of the Schmitt trigger pair of double triode 6. When this occurs the regenerative action of the Schmitt circuit causes it to change from the quiescent state to the triggered state, i. e., from the state where the first section of tube 6 is conducting to the state where the second section conducts. Since the plate circuit of the second section of triode 6 is connected to B+ through a large resistor 29 which serves to slowly charge condenser 38, relay 7 is energized only momentarily, during the conduction of the second section of tube 6, and until condenser 38 is discharged. Since relay 7 is only momentarily energized, condenser 4 is recharged to the point where its negative potential cuts off tube 3 and returns the Schmitt circuit to its normal state. During this operation the energizing of the relay completes a circuit from condenser 4 through line 31, armature 30, front contact of relay 7 voltage divider 34 and 35 to B+, and places a charge on condenser 4. At the same time the second armature of relay 7 upon reaching front contact position energizes the mechanical register 8 and causes it to actuate the counting mechanism to record the count.

When the condenser 4 becomes charged, the charge tends to leak off to ground through resistor 32; this action causes the control grid of electrometer tube 3 to become more negative so as to cut off this tube. This causes the potential of the anode to rise to a more positive level which is coupled through resistor 22 to the control grid of the first section of the double triode 6. This positive level triggers the Schmitt circuit and causes the first section to conduct and the second section of tube 6 to cease conducting. When the second section of double triode tube 6 ceases to conduct, condenser 38 is then permitted to recharge and the relay 7 is deenergized and the armatures 30 and 33 drop to back contact position. The opening of armature 30 removes the charging current from the condenser 4 and permits it to remain in its reset position until the charge thereon is changed by the action of ionization in the radiation detecting instrument. This process is repeated over and over again and the recorder 8 counts the total of the radiation. Its indication provides a measure of radiation dosage which the individuals in the area have received over a predetermined length of time.

The embodiment of Figure 2 includes an audible type of alarm system for alerting personnel in the area where the radiation is being measured. The ion chamber-electrometer tube-condenser arrangement is the same as that described in connection with the embodiment of Figure 1. The electrometer tube 3 is then coupled through conventional resistance capacitance coupling 40, 41 to a double triode 6' having its cathodes tied together and grounded through a common cathode resistor 26' and having its anodes tied together and coupled through an appropriate transformer 42 to a loud speaker or other device for converting electrical energy to sound. Diode 44 serves as a part of a relaxation oscillator and charges up condenser 45. Reset is accomplished through a reset switch 46. The operation of this latter portion of the system is similar to that described in the prior copending application of Glass supra.

When the electrometer tube is driven above cut off the plate thereof is increased causing the oscillator unit 44 to increase in frequency. This frequency increase is made audible by the speaker 43. The unit may then be reset manually by means of the switch 46.

The radiation detecting device of Figure 3 comprises a hollow cylinder 9 of insulating material such as linen filled bakelite, having its inner walls coated with a colloidal dispersion of graphite such as Aquadag. The upper end of the cylinder 9 is closed with a disk shaped element 50 of bakelite or other suitable material. The lower end of the cylinder receives a bakelite ring 12 and abuts against a shoulder 51 formed thereon. Mounted coaxially of the cylinder and disposed therein is the collecting electrode 2 of aluminum or other suitable material. The lower end of the aluminum electrode 2 is reduced and receives a metal disk 15 of aluminum foil or other suitable material. This disk 15 is held in place by a metal spacer or sleeve 52 which is urged into clamping relation with the disk 15 and towards the shoulder 53 at the upper extremity of the reduced end of the collector 2. The lower end of the reduced portion of collector 2 is threaded and carries a nut 54 thereon. Interposed between the spacer 52 and the nut 54 is an insulating element 11 of fluorothene or other suitable material. Element 11 is adapted to abut against a ring shaped electrode 4 at its outer periphery. The ring shaped electrode 4 is preferably formed by machining and may be of any suitable material such as aluminum, and is recess seated in the insulating ring 12. It has a portion 14 integral therewith which extends inwardly in overlapping relation with the disk shaped electrode 15 and is adapted to lie along the upper face of the insulating element 11. Ring shaped electrode 4 is held in place in the bakelite insulating ring 12 by means of a series of screw carried washers 55. The screw carrying washers 55 are threaded into sockets in the insulating ring 12 as indicated at 56. Screw and nuts 57 form the electrical connection to the inside of the ion chamber for the accelerating potential. The screws 56 also serve the purpose of maintaining the ring electrode 4 in place and supporting the insulating element 11 in assembled relation. When the electrode 4 is mounted in place in ring shaped end 12 it serves to clamp disk 13 in place between it and the recessed wall of end 12. This arrangement completes a three plate condenser consisting of plates 13 and 14 which are in contact with electrode 4, and plate 15 which is in electrical contact with the collector electrode 2. In this arrangement the electrode 4 not only serves as a portion of the condenser but also performs the function of a guard ring for the radiation detector. This arrangement is disposed within a can 16 of cylindrical shape which comprises cylindrical sidewalls of any desired form of metal such as brass or steel with a tin coating and opposed endwalls 58, and 59 of similar material such as brass. The upper end 59 may be held in place by swaging or spinning the end edge of the cylinder over the periphery of end 59 and sealing it. The lower end wall 58 is removable and is sealed in place by packing ring 60 which is adapted to seat in an annular groove 61 in the outer periphery of the end 58. The end 58 is mechanically joined to the cylindrical sidewall of the can 16 by means of screws 62 which pass through the cylindrical walls and threadedly seat in the end 58. However, other suitable conventional means may be employed for effecting this connection. After assembly, the ion-chamber is evacuated and filled with dry air or dry nitrogen to a pressure of one atmosphere. This is accomplished by a copper filling tube 70 in end wall 58. The filling tube is threaded and screwed in the end wall and is soft soldered at the joint to produce a seal. For the purpose of mounting the element 9 in place a plurality of spacers 63 may be employed. These spacers serve to position insulating ring 12 above the end wall 58 of the can. They are a part of a series of mountings which included screws 72 which pass through sleeve 63 and openings in plates 71. Screws 72 thread into end 58 and maintain the spacers 63 and plates in assembled relation. The plates in turn are joined to ring 12 by screws 73 which pass through additional openings therein and seat in threaded sockets in ring 12, as shown in Figure 4.

Disposed within the can and positioned beneath the insulating element 11 and the lower end 12 of the radiation detector cylinder is the electrometer tube 3. This tube may be mechanically supported through the wires or leads 64. These leads are carried to circuits which are located externally of the radiation detecting device by means of a Kovar plate 65 through which glass coverings 66 for leads 67 are indicated. The Kovar seal between glass and Kovar plate maintains the isolation of the radiation detector from external atmospheric conditions. The leads 67 are then connected into a socket arrangement having a series of prongs. These prongs 68 are mounted in a conventional base 69 which plugs into a standard tube socket. The base 69 is then disposed within and clamped to the cylindrical portion 17 whose upper end is screw threaded and which fits into a socket in the end 58 of the can. The Kovar seal 65, 66, 67 is soft soldered to end wall 58.

From the foregoing, it may be noted that leakage paths have been reduced to a minimum. None of the insulation in the grid and chamber electrode circuits is exposed to atmospheric conditions which might involve subjecting either of them to moisture and dirt. Nor is this arrangement D. C. coupled to any circuit which is exposed to the atmosphere. All lead or coupling circuits that come out of the can are of moderately low impedance. All high impedance circuitry is enclosed in the can and hermetically sealed. Consequently, it is possible to use smaller condensers and a smaller ion chamber for a given sensitivity of instrument than is possible with the conventional instruments of like sensitivity which are available commercially. For comparable sensitivity in an ion chamber which is not hermetically sealed and is not connected to the electrometer tube in the manner of this invention it would be necessary to provide an ion chamber of the order of several hundred times as large as that employed by applicants. This arrangement provides a sensitivity that is physically prohibitive in other known instruments of comparable size.

Having thus described our invention, we claim:

1. A system for detecting radiation comprising a radiation detector having a pair of electrodes, an electrometer tube having its input circuit coupled directly to one of said electrodes, a trigger circuit fed by the electrometer tube for driving a counter, a source of power capacitatively coupled to the electrometer tube and to said detector, and means responsive to the operation of the trigger circuit for controlling the potential of the input circuit of the electrometer tube.

2. A system for integrating radiation comprising a radiation detector having a plurality of electrodes, an electrometer tube having its input circuit directly connected to one of said electrodes, a condenser coupled to the input of said electrometer tube, and means for charging the condenser to periodically render the electrometer tube inoperative.

3. A system for integrating radiation comprising a radiation detector having a plurality of electrodes, an electrometer tube having its input circuit directly connected to one of said electrodes, a condenser coupled to the input of said electrometer tube, and means for charging the condenser to periodically render the electrometer tube inoperative, said means including a control circuit responsive to the operation of the electrometer tube for coupling a voltage source to said condenser to charge it.

4. A system for integrating radiation comprising a radiation detector having a plurality of electrodes, an electrometer tube having its input directly connected to one of said electrodes, a condenser coupled to the input of said electrometer tube, and a means for charging the condenser to periodically render the electrometer tube inoperative, said means including a trigger circuit fed by the electrometer tube for coupling the condenser to a power source to charge it.

5. A system for integrating radiation comprising a radiation detector having a plurality of electrodes, an electrometer tube having its input circuit directly connected to one of said electrodes, a condenser coupled to the input of said electrometer tube, and means for charging the condenser to periodically render the electrometer tube inoperative, said means including a trigger circuit fed by the electrometer tube and having a relay in its output circuit energized by said trigger circuit to momentarily connect said condenser to a source of charging potential.

6. A system for integrating radiation comprising a radiation detector having a plurality of electrodes, an electrometer tube having its input circuit directly connected to one of said electrodes, a condenser coupled to the input of said electrometer tube, and means for charging the condenser to periodically render the electrometer tube inoperative, said means including a trigger circuit having one section coupled to the output of the electrometer tube and the other section coupled to a relay whereby operation of the trigger circuit serves to momentarily connect said condenser to a source of charging current.

7. A system for integrating radiation comprising a radiation detector having a plurality of electrodes, an electrometer tube having its input directly connected to one of said electrodes, a condenser coupled to the input of said electrometer tube, and means for charging the condenser to periodically render the electrometer tube inoperative, said means including a trigger circuit having a double triode, one section of said trigger circuit being coupled to the output of the electrometer tube and the other section having a relay in its output, said relay being connected to said condenser and to a source of charging current, whereby signals from said electrometer tube which trip said trigger circuit serve to alternately connect and disconnect the condenser to the source of charging current.

8. A system for integrating radiation comprising a radiation detector having a plurality of electrodes, an electrometer tube having its input directly connected to one of said electrodes, a condenser coupled to the input of said electrometer tube, and means for charging the condenser to periodically render the electrometer tube inoperative, said means including a trigger circuit fed by the electrometer tube, said trigger circuit having a relay in its output and a capacitor power circuit coupled to the relay, whereby operation of said trigger circuit serves to momentarily energize the relay and connect said condenser to a source of charging current.

9. A system for integrating radiation comprising a radiation detector having a plurality of electrodes, an electrometer tube having its input directly connected to one of said electrodes, a condenser coupled to the input of said electrometer tube, and means for charging the condenser to periodically render the electrometer tube inoperative, said means including a trigger circuit having one section fed by the output of the electrometer tube and the other section coupled to a circuit including a relay and a resistatively charged capacitor, and a second circuit including the relay, condenser and a source of charging current, whereby operation of the trigger circuit serves to energize the relay and momentarily connect the condenser to a source of charging current.

10. A system for integrating radiation comprising a radiation detector having a plurality of electrodes, an electrometer tube having its input directly connected to one of said electrodes, a condenser coupled to the input of said electrometer tube, and means for charging the condenser to periodically render the electrometer tube inoperative, said means including a trigger circuit having one section coupled to the output of and fed by the electrometer tube, and the anode circuit of the other section being coupled through a relay to a resistor charged capacitor source of power, and a second circuit including the relay, condenser and source of charging current, whereby operation of the trigger circuit completes the circuit to the source of power, momentarily energizes the relay to charge the condenser, and actuates the trigger circuit.

References Cited in the file of this patent

UNITED STATES PATENTS

| | | |
|---|---|---|
| 2,487,332 | Hagen | Nov. 8, 1949 |
| 2,532,836 | Cupido et al. | Dec. 5, 1950 |
| 2,651,726 | Froman et al. | Sept. 8, 1953 |
| 2,721,945 | Sell et al. | Oct. 25, 1955 |
| 2,728,862 | De Bourgknecht | Dec. 27, 1955 |